United States Patent
Lei

(10) Patent No.: US 7,822,272 B2
(45) Date of Patent: Oct. 26, 2010

(54) ADAPTIVE HISTOGRAM EQUALIZATION FOR IMAGES WITH STRONG LOCAL CONTRAST

(75) Inventor: Zhichun Lei, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 970 days.

(21) Appl. No.: 11/618,030

(22) Filed: Dec. 29, 2006

(65) Prior Publication Data

US 2007/0230788 A1   Oct. 4, 2007

(30) Foreign Application Priority Data

Mar. 31, 2006   (EP)   ................... 06006925

(51) Int. Cl.
*G06K 9/00* (2006.01)
*H04N 5/14* (2006.01)

(52) U.S. Cl. .................. 382/168; 382/181; 382/199; 348/671

(58) Field of Classification Search ......... 382/168–172, 382/181, 199; 348/671–675
See application file for complete search history.

(56) References Cited

U.S. PATENT DOCUMENTS

| | | | | |
|---|---|---|---|---|
| 3,983,320 A | * | 9/1976 | Ketcham et al. | 348/672 |
| 4,187,519 A | * | 2/1980 | Vitols et al. | 348/28 |
| 5,042,077 A | * | 8/1991 | Burke | 382/169 |
| 5,426,684 A | * | 6/1995 | Gaborski et al. | 378/62 |
| 5,524,070 A | * | 6/1996 | Shin et al. | 382/274 |
| 5,588,071 A | * | 12/1996 | Schultz | 382/168 |
| 5,717,791 A | * | 2/1998 | Labaere et al. | 382/274 |
| 5,923,383 A | * | 7/1999 | Kim | 348/672 |
| 5,970,164 A | * | 10/1999 | Bamberger et al. | 382/128 |
| 5,982,926 A | * | 11/1999 | Kuo et al. | 382/167 |
| 6,049,626 A | * | 4/2000 | Kim | 382/167 |
| 6,148,103 A | * | 11/2000 | Nenonen | 382/169 |
| 6,163,621 A | * | 12/2000 | Paik et al. | 382/169 |
| 6,650,774 B1 | * | 11/2003 | Szeliski | 382/169 |
| 6,804,408 B1 | * | 10/2004 | Gallagher et al. | 382/272 |

(Continued)

FOREIGN PATENT DOCUMENTS

EP   1 465 436 A1   10/2004

(Continued)

OTHER PUBLICATIONS

J. Alex Stark, "Adaptive Image Contrast Enhancement Using Generalizations of Histogram Equalization", IEEE Transactions on Image Processing, vol. 9, No. 5, May 2000, pp. 889-896.

(Continued)

*Primary Examiner*—Manav Seth
(74) *Attorney, Agent, or Firm*—Oblon, Spivak, McClelland, Maier & Neustadt, L.L.P.

(57) ABSTRACT

The present invention relates to a method, apparatus and computer program product for contrast enhancement of images based on adaptive histogram equalization. In particular it relates to preventing adaptive histogram equalization from causing fading artifacts and object extension artifacts. An adaptive histogram equalization method is provided comprising the steps of dividing an image into regions of pixels, determining structures of local pixel value differences of a predefined strength of the image, building for every region a histogram of the pixel values based on the determined structures of local pixel value differences and mapping pixel values of each region based on the histogram corresponding to the region.

23 Claims, 3 Drawing Sheets

U.S. PATENT DOCUMENTS

| | | | |
|---|---|---|---|
| 6,836,570 B2 * | 12/2004 | Young et al. | 382/274 |
| 6,915,024 B1 * | 7/2005 | Maurer | 382/274 |
| 7,221,408 B2 * | 5/2007 | Kim | 348/671 |
| 7,573,533 B2 * | 8/2009 | Moldvai | 348/678 |
| 7,636,496 B2 * | 12/2009 | Duan et al. | 382/274 |
| 2001/0021264 A1 * | 9/2001 | Armato et al. | 382/132 |
| 2003/0161549 A1 * | 8/2003 | Lei et al. | 382/274 |

FOREIGN PATENT DOCUMENTS

EP    1 515 274 A1    3/2005

OTHER PUBLICATIONS

John M. Gauch, "Investigations of Image Contrast Space Defined by Variations on Histogram Equalization", CVGIP: Graphical Models and Image Processing, vol. 54, No. 4, Jul. 1992, pp. 269-280.

J.A. Stark, et al., "Model-Based Adaptive Histogram Equalization", Signal Processing, 37, 1994, pp. 193-200.

Joung-Youn Kim, et al., "An Advanced Contrast Enhancement Using Partially Overlapped Sub-Block Histogram Equalization", IEEE Transactions on Circuits and Systems for Video Technology, vol. 11, No. 4, Apr. 2001, pp. 475-484.

Raman B. Paranjape, et al., "Adaptive-Neighborhood Histogram Equalization for Image Enhancement", CVGIP: Graphical Models and Image Processing, Academic Press, Duluth, MN, GB, vol. 54, No. 3, XP000281965, ISSN: 1077-3169, May 1, 1992, pp. 259-267.

Jia-Guu Leu, "Image Contrast Enhancement Based on the Intensities of Edge Pixels", CVGIP: Graphical Models and Image Processing, Academic Press, Duluth, MN, GB, vol. 54, No. 6, XP000332318, ISSN: 1077-3169, Nov. 1, 1992, pp. 497-506.

* cited by examiner

ADAPTIVE HISTOGRAM EQUALIZATION FOR IMAGES WITH STRONG LOCAL CONTRAST

FIELD OF THE INVENTION

The present invention relates to a method, apparatus and computer program product for contrast enhancement of images based on adaptive histogram equalization. In particular it relates to preventing adaptive histogram equalization from causing fading artifacts and object extension artifacts.

DESCRIPTION OF THE RELATED PRIOR ART

Histogram equalization is a an effective technique for improving the contrast of an image. The guiding principle of histogram equalization is to equate good contrast of an image with a uniform distribution of the histogram of the intensity of the image's pixels.

Histogram equalization proceeds typically as follows. First, a histogram is built from the values of intensity of each pixel of an image. After building, the histogram is advantageously processed by smoothing it. Then a cumulation function is derived from the histogram. This typically is the cumulative histogram. From the cumulation function then, a mapping function is generated. This typically involves normalization of the cumulation function and applying an offset. Finally, the intensity values of the pixels are mapped to new values of intensity as prescribed by the mapping function. The result of this process will be an image with a more uniformly distributed histogram, that is, an image with an enhanced contrast.

This process can be applied to the entire image at once or the image can be divided into possibly overlapping subsections called regions or blocks to each of which the process is applied separately. The first approach is called global histogram equalization, the later is called local histogram equalization or adaptive histogram equalization. The local histogram equalization can well adapt to local image features, whereas the global histogram equalization can encounter problems in case of such local features. Although the computational load of local histogram equalization is usually much higher than that of global histogram equalization, it has attracted more and more interest in the area of image contrast enhancement, due to its superior performance.

Local histogram equalization techniques are dealt with e.g. in William K. Pratt, "Digital Image Processing", 3$^{rd}$ Edition, ISBN 0-471-37407-5, John Wiley & Sons, Inc., 2001.

Local histogram equalization may cause plainly observable and disturbing artifacts, including:

Blocking artifacts, that is, the block structure used for block-wise processing is discernible in the processed image, most notably at the block boundaries.

Fading artifact, which is the term referring to the fact that some areas of an image go pale after adaptive histogram equalization. Typically areas near contrasting objects are affected. Since the human visual perception is much finer for (human) skin colored objects than general objects, this artifact is especially disturbing when skin color areas are affected.

Boundary smearing artifact, which is the term referring to the fact that boundary areas of contrasting objects (e.g. dark and bright objects) become "smeared" or un-sharp and thicker than before. The boundary smearing artifact is also known as object extension artifact.

Overall image contrast loss. Since the local processing is ignorant of the global histogram information, the global contrast may be negatively affected. For instance, local histogram equalization can make the background of an image as clear as the target object on that image. This emphasized background confuses the human sense of distance.

The European patent application EP 1 515 274, which is of the same applicant as is the present invention, addresses the problem of blocking artifacts and overall image contrast loss. By homogenizing the blocks' histograms, i.e. by weighting and summing histograms of preferably spatially adjacent blocks, blocking artifacts and the overall image contrast loss are reduced. Homogenizing histograms is computationally more efficient than overlapping of blocks, a technique also employed to reduce blocking artifacts and the overall image contrast loss. Histogram homogenization can be combined with overlapping blocks.

The European patent application EP 1 465 436, which is of the same applicant as is the present invention, addresses the fading artifact. The method disclosed in EP 1 465 436 builds the histogram from the luminance component of an image signal, such as a TV signal. The chrominance components of the image signal are used to identify skin color areas. Pixels found in skin color areas are used to modify the histogram in a way that it distributes more uniformly, so that the histogram equalization does not change or only slightly changes the signals in human skin color areas. Pixels found in non-skin colored areas are used to build the histogram in the same way as in standard histogram equalization.

Object of the invention is to reduce the object extension artifacts and fading artifacts of adaptive histogram equalization.

SUMMARY OF THE INVENTION

To achieve this object the present invention provides an adaptive histogram equalization method for enhancing the contrast of digital images comprising the steps of dividing an image into regions of pixels, determining structures of local pixel value differences of a predefined strength of the image, building for every region a histogram of the pixel values based on the determined structures of local pixel value differences and mapping pixel values of each region based on the histogram corresponding to the region.

To achieve this object the present invention further provides an adaptive histogram equalization processor for enhancing the contrast of digital images comprising a region specifying device for dividing an image into regions of pixels, a structure determining device for determining structures of local pixel value differences of a predefined strength of the image, a histogram building device for building for every region a histogram of the pixel values, based on the determined structures of local pixel value differences, a mapping device for mapping pixel values of each region based on the histogram corresponding to the region.

To achieve this object the present invention further provides a software product comprising program information that, when executed in a computing device, is operable to carry out the above adaptive histogram equalization method.

The apparatus, method and software product for adaptive histogram equalization provided by the present invention reduce fading artifacts and boundary smearing artifacts. The present invention permits the reduction of fading artifacts in skin color areas without requiring access to color information and allows for the reduction of fading artifacts also in non skin color regions.

The adaptive histogram equalization method is favorably developed as set forth below:

Favorably, for every region with a determined structure of local pixel value difference, a first side and a second side opposite to said first side in relation to the structure are defined.

Favorably, for regions with a determined structure of local pixel value differences the histogram is built from the pixel values of the pixels located on said first side of the structure.

Favorably, for regions with a determined structure of local pixel value differences the amount of pixels located on said second side of the structure modifies the histogram, whereby the larger the number of pixels on said second side the higher the degree of balance or of uniform distribution of the histogram obtained in said building step.

Favorably, the pixels on said second side are accounted for in the histogram as if one part of the pixels were carrying a minimum value and the other part a maximum value.

Favorably the adaptive histogram equalization method comprises a step of smoothing the histograms or smoothing functions derived from the histograms and used, directly or indirectly, in the step of mapping pixel values.

Favorably, for regions with no determined structure of local pixel value differences the histogram is built from the pixel values of all pixels of the region.

Favorably, said structures of local pixel value differences of a predefined strength are determined by an edge detection method, for example the Sobel operator.

Favorably, single and sparsely distributed edge points determined by the edge detection method are deleted and/or broken edges are connected by means of e.g. morphological filters.

The adaptive histogram equalization method favorably comprises a step of determining skin colored pixels, whereby for regions with skin colored pixels the amount of skin colored pixels modifies the histogram, whereby the larger the number of skin colored pixels in the region the higher the degree of balance or of uniform distribution of the histogram obtained in said building step.

Favorably, the histograms are homogenized.

Favorably, the regions are overlapping and only the values of pixels located in the non-overlapping part of a region are mapped in the step of mapping pixel values of each region based on the histogram corresponding to the region.

Favorably, the pixel values are values relating to the brightness and/or colorness of the pixels, for example the luminance value and/or chrominance or chrominance difference values of a YUV, YIQ, or YCbCr color or other model based image format.

The adaptive histogram equalization processor is favorably developed as set forth below:

Favorably, for every region with a determined structure of local pixel value difference a first side and a second side opposite to said first side in relation to the determined structure are defined.

Favorably, for regions with a determined structure of local pixel value differences the histogram building device is adapted to build the histogram from the pixel values of the pixels located on said first side of the determined structure.

Favorably, for regions with a determined structure of local pixel value differences the histogram building device is adapted to modify the histogram based on the amount of pixels located on said second side of determined structure, whereby the larger the number of pixels on said second side the higher the degree of balance or of uniform distribution of the histogram obtained by the histogram building device.

Favorably, the histogram building device is adapted to account for the pixels on said second side in the histogram as if one part of the pixels were carrying a minimum value and the other part a maximum value.

Favorably, the processor further comprises a filtering device for smoothing the histograms or for smoothing functions derived from the histograms and used, directly or indirectly, by the mapping device for the mapping of the pixel values.

Favorably, for regions with no determined structure of local pixel value differences the histogram building device is adapted to build the histogram from the pixel values of all pixels of the region.

Favorably, the structure determining means is adapted to detect said structures of local pixel value differences of a predefined strength by an edge detection method, for example the Sobel operator.

Favorably, the structure determining means is adapted to delete single and sparsely distributed edge points determined by the edge detection method and/or is adapted to connect broken edges by means of e.g. morphological filters.

Favorably, the processor further comprises a skin color detection device for determining skin colored pixels, whereby for regions with skin colored pixels the histogram building device is adapted to modify the histogram based on the amount of skin colored pixels, whereby the larger the number of skin colored pixels in the region the higher the degree of balance or of uniform distribution of the histogram obtained by the histogram building device.

Favorably the histograms are homogenized.

Favorably, the regions are overlapping and the mapping device is adapted to map only the values of pixels located in the non-overlapping part of a region.

Favorably, the pixel values are values relating to the brightness and/or colorness of the pixels, for example the luminance value and/or chrominance or chrominance difference signals of a YUV, YIQ, or YCbCr or other color model based image format.

The present invention is most easily implemented if the input image is digital. If this is not the case, conversion from analog format to digital format can be affected prior to the contrast enhancement processing of the image. The input image may be a color or a monochrome image. The input image may be a single image or it may be an image sequence. In other words, the present invention may be applied to still images like photographs or to image sequences like video images. The present invention can for example be employed when the input image format comprises data which relates to the brightness of the image's pixels, for example the grayscale value of a grayscale scanned image or the luminance of a video signal, e.g. of a standard TV-signal. Such brightness data may however be generated from the data of the input format any time before the brightness data is used, e.g. by a conversion from Red-Green-Blue (RGB) color model to a Luminance-Chrominance color model, like the YUV, YIQ and YCbCr color models used by the PAL, NTSC and video "TV-standards", respectively. It is also possible to map pixel values of a different kind, than the pixel values for which the structures of local pixel value difference of a predefined strength are determined and from which the histogram is built. For example, one can map pixel values relating to brightness, based on a histogram built from pixel values relating to green color, whereby the histogram was obtained based on structures of local green pixel value differences of a predefined strength. To work with the green component of a color signal has the advantage that the green color component normally has the best signal to noise ratio. Also, the present invention may be applied to enhance the contrast of data which is not data relating to brightness, this may be data relating to color or any other data.

The invention can likewise be seen in method or in a corresponding apparatus or computer program product. While the present description may, for the sake of brevity, limit itself to a description of the method of the invention, the teachings of this specification are to be understood as applying equally to and encompassing a corresponding apparatus and computer program product capable of effecting the functionality of the described method.

DESCRIPTION OF THE PREFERRED EMBODIMENTS

Figure 1:
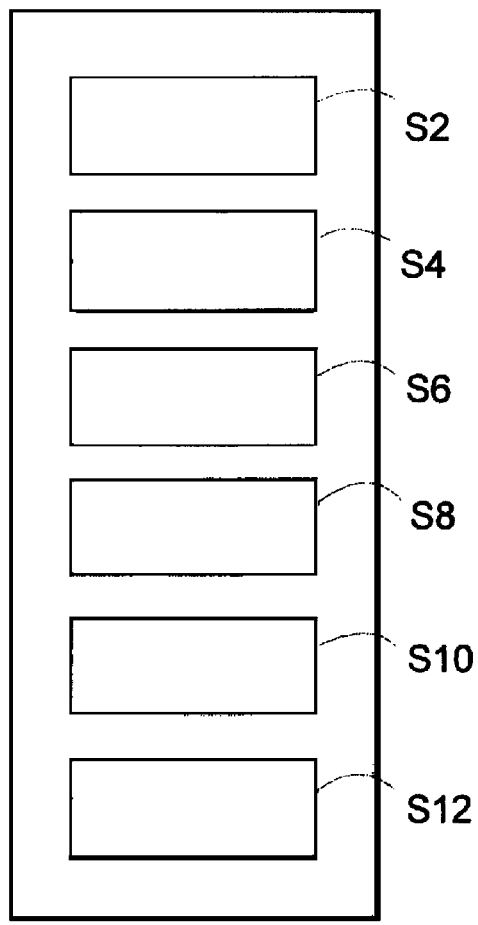
FIG. 1 shows a block diagram of an adaptive histogram equalization method. Optional steps of the method are included.

FIG. 1 shows a block diagram of an adaptive histogram equalization method according to the present invention. In a step S2 an image is divided into regions of pixels. In a step S4 structures of local pixel value differences of a predefined strength of the image are determined. In a step S8, for every region, a histogram of the pixel values is built, based on the determined structures of local pixel value differences. In a step S12 pixel values of each region are mapped based on the histogram corresponding to the region. Optionally, skin colored pixels are determined in step S6. In that case, the building of the histogram in step S4 is also based on the determined skin colored pixels. Optionally, the histogram of each region is smoothed in a step S10.

These steps can be carried out for every region independently. This means for example that while one region's pixel values have already been mapped, a histogram for another region may just be built and still another region might not even have been defined.

Figure 2:
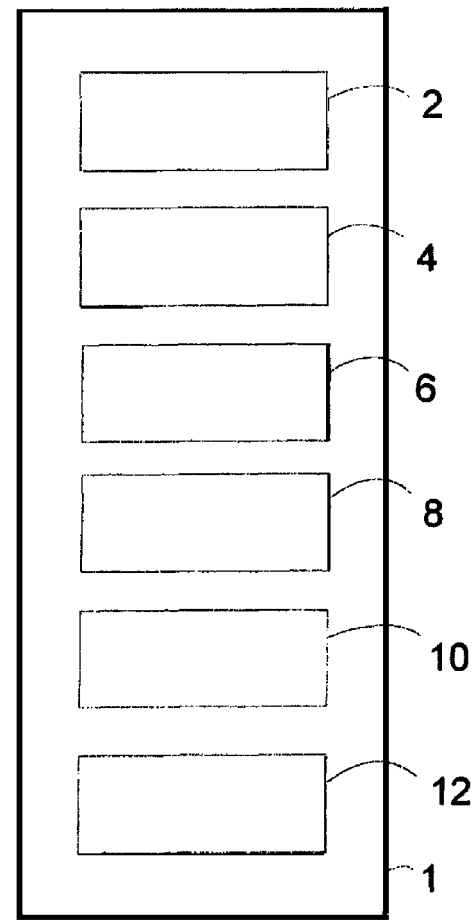
FIG. 2 shows a block diagram of an adaptive histogram equalization processor. Optional devices of the processor are included.

FIG. 2 shows a block diagram of a corresponding adaptive histogram equalization processor 1. The adaptive histogram equalization processor 1 comprises a region specifying device 2 for dividing an image into regions, a structure determining device 4 for determining structures of local pixel value differences of a predefined strength of the image, a histogram building device 8 for building, for every region, a histogram of the pixel values, based on the determined structures of local pixel value differences and a mapping device 12 for mapping pixel values of each region based on the histogram corresponding to the region. Optionally, the processor 1 comprises a skin color detection device 6 for determining skin colored pixels. In that case, the histogram building device 8 is adapted to build the histogram based on the determined structures of local pixel value differences and based on the determined skin colored pixels. Optionally, the processor 1 comprises a filtering device 10 for smoothing the histograms.

The devices 2, 4, 6, 8, 10, 12 of the processor 1 can be implemented by any computing device or any device capable of information processing. For example, by a suitable programmed personal computer, by a computing device based on a digital signal processor adapted for image manipulation, or any other microprocessor based information processing device. The devices 1, 4, 6, 8, 10, 12 of the processor 1 may be implemented by the very same piece of hardware or by different pieces of hardware. An embodiment of an adaptive histogram equalization method according to the present invention is now explained with reference to FIG. 3 to 7.

Additional elements may be required for the practical implementation of the processor 1 including, for example, housing, power supply, data interfaces, data connections, buffer. Such elements needed for practical implementation are not mentioned in the description since they are a matter of course for the skilled person set out to implement the present invention.

For simplicity, the input image processed by the embodiment of the method is assumed to be an image in a digital format, the format comprising luminance data. The regions of pixels are of rectangular shape and called block. However, other than rectangular forms can be employed too. The form and the location of the regions are independent of the image content and especially are independent of the structures of local pixel value differences. See below for more details on the division of the image into regions of pixels. The block-wise processing is from left to right and from top to bottom. This corresponds to the order in time in which standard TV and video-signals carry the image information. To process a signal in the inherent order of the signal is favorable since processing is faster and less memory is required. Many other ways of block-processing are possible though, for example, blocks could be, partially at least, processed in parallel.

Figure 3:
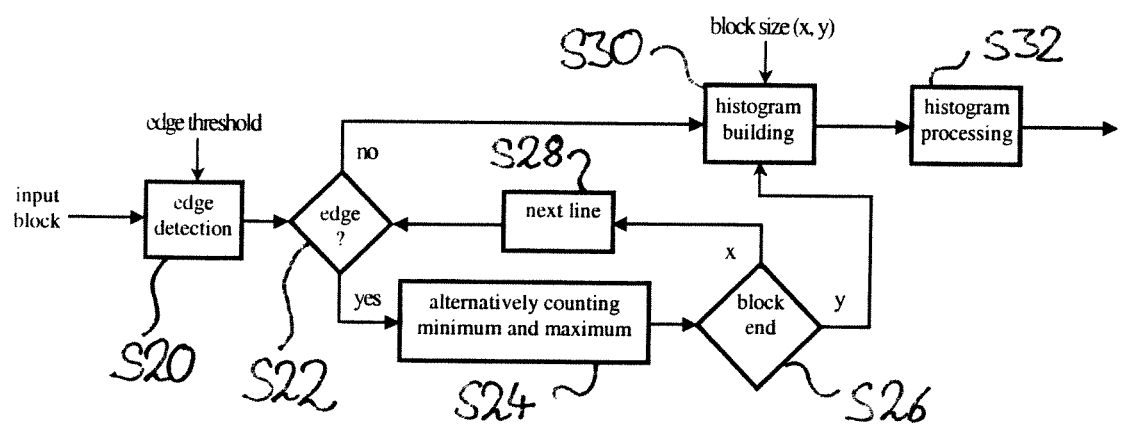
FIG. 3 shows a flow diagram describing aspects of an embodiment of the adaptive histogram equalization method.

In FIG. 3 a flow diagram of a central part of the method's embodiment is shown. The diagram comprises the processing of a block from the determination of structures of local pixel value differences up to the processing of the histogram including smoothing of the histogram.

In step S20 structures of local luminance value difference of a predefined strength of a block are determined by an edge detection method. The sensitivity of the edge detection is adjustable via an edge threshold parameter. Generally, the predefined strength defines a lower limit for the strength of the local pixel value differences whereby strength can be measured by any appropriate method. As noted above, typically contrasting objects are the cause of fading artifacts and object extension artifacts. In a typical use of the present invention, the determined local pixel value differences can be seen as large or strong compared to the local pixel value differences corresponding to a gradual change. In this sense, the structures determined are structures of strong local pixel value differences. Though, nothing prevents the present applications from being used with low pixel value differences. A more precise value for the strength of the local pixel value differences can hardly be given. Image properties such as the amount of noise in the image or the kind of motif of the image have an influence on the finding of an operable value. Moreover, in some fields of application this depends on the personal taste of an operator, in high quality video post-production, for example, the edge parameter may be adjusted according to needs by a human operator. Also, in the manipulation of digital photographs in a computer based application, which today is practice even in non-professional photography, the user may have direct access to the strength. As another example, the user of a camcorder may select from a range of presets each optimized for typical recording situations, whereby the preset, inter alia, sets a value for the strength of the pixel value differences to be determined. Another possibility is an automatic setting based on recording conditions such as for example lightning condition or based on other previously gained information about the image, for example, information gained in a previous image manipulation step. Also, different values might be set for different areas of the image, for example, for different regions.

For the purpose of illustration, the information obtained can be displayed as an image. The image of FIG. 6 was obtained processing the entire image of FIG. 5 using the well-known Sobel operator. The determined structures of local pixel value difference are displayed white on a black background. The determined structures of local pixel value difference may also be called edges, edge lines, edge points, boundary, boundary line, boundary information, etc. One sees that the structures of local pixel value difference match with the boundary lines of contrasting objects. Generally, the structures of local pixel value differences are not limited to any shape.

In step S22, when coming in from step S20, it is determined if edges exist in the block. If no, the histogram proceeds to step S30. If, yes the histogram proceeds to step S24.

In step S24 the pixels behind the edge are accounted for in the histogram as if alternatively having a minimum and a maximum luminance value, e.g. 16 and 235 for standard 8 bits quantized TV-signal. The minimum and the maximum value may differ to some extent from the minimally and maximally possible values in a given image format as long as they still correspond to a rather small or rather large value within the possible dynamic range.

The decision if a pixels lies behind or in front of an edge may be based on the processing order, but, generally, the roles of the pixels in front of the edge and the pixels behind the edge can be exchanged. For simplicity of terminology only, we will speak of pixels behind or in front of an edge.

In step S26 it is decided which kind of block end is reached. If the block end in horizontal x-direction is reached the process proceeds to step S28 where the process locates to the next line and from where the process proceeds to step S22. If the block end in vertical y-direction is reached, the process proceeds to step S30.

In step S22, when coming in from step S 28, it is decided whether further edges exist. If yes, the process proceeds to step S24. If no, the process proceeds to step S30.

In step S30 the pixel values of the pixels lying in front of the edges are directly taken into account for building the histogram. After step S30 the histogram building is finished and the process proceeds to step S32.

Thus, for picture areas without strong local contrast, the histogram is built as usual. For areas with strong local contrast, only the pixels in front of the detected object boundary are directly taken into account for the histogram building. The occurrences of other pixels are not directly taken into account but are used as indices to modify the histogram in question to make it more uniform, or have it behave like a more uniform histogram, here by alternatively counting a minimal and a maximal value to the histogram until the block end is reached. The alternatively counting is done until both the horizontal (x) and the vertical (y) block end is reached. From the edge starting position to the end of the block, the histogram takes only the minimal and maximal value.

In step S32 the histogram is processed. This includes smoothing the histogram, for example by filtering it with a low pass filter. The histogram obtained may be mixed in a weighted sum with the previously obtained histograms of the adjacent blocks. This is a simple scheme for histogram homogenization. Generally, histogram homogenization reduces artifacts from being caused by single edge points, sparsely distributed edge points or broken edges. Instead of, or additional to, histogram homogenization, one can also delete single or sparsely distributed edge points and connect broken edges by means of e.g. the well-known morphological filters as part of step S20.

After step S32 a mapping function is derived from a cumulative function of the smoothed histogram and the luminance values of the block are mapped according to the mapping function. Note however, that the present embodiment does not map all pixels of a block. This is explained in more detail below. When all blocks have been processed and the corresponding pixels have been mapped the histogram equalization is finished for the input image.

To alternatively count a minimum and a maximum value has the effect of balancing the histogram, therefore making it more uniformly, especially after it is smoothed. The more uniformly distributed the histogram is, the smaller the changes of the pixels' values will be upon the mapping with the mapping function derived from the histogram. Thus, the amount of histogram equalization is reduced for blocks containing edge points. Put differently, the amount of histogram equalization is reduced for areas comprising contrasting objects. Consequently, fading artifacts and boundary smearing artifacts are reduced. For regions without an edge, the histogram is built as usual. Therefore, histogram equalization is effected to the full amount in areas removed from contrasting objects. Instead of smoothing the histogram, one could also smooth the cumulative function derived from the histogram, the effect, a reduced amount of histogram equalization, is the same.

The pixels in front of a boundary line are taken directly into account, for building the histogram, whereas the pixels after a boundary line are used as indicators to modify the histogram in question to make it more uniform, or have it behave like a more uniform histogram. In case of the embodiment, this is effected by alternately counting a minimum and a maximum luminance value until the end of the block is reached. This balances the histogram which results in a histogram more uniformly distributed after smoothing than a corresponding smoothed histogram built entirely from the actual pixel values would be. Thus the effect of balancing is a histogram that behaves like a more uniformly distributed histogram. Other ways are possible to modify the building of a histogram to achieve a similar result however. Also, uniformity can be achieved more directly. The pixels which are not accounted for with their actual values could for example be used to fill the gaps in a histogram built from the other pixels, which are accounted for with their actual values, thereby adding directly to the uniformity of the histogram.

If the pixels in front of the detected boundary line take up an overwhelming part of the block, the histogram modification does not play or play only a little role in the final result. For this case, according to experiences, fading artifacts and object extension artifacts are usually very weak, that is, are invisible anyway. The less the part that the pixels in front of the boundary line take up of the block, the more apparently fading artifacts and object extension artifacts appear according to experiences, however, the stronger is also the histogram modification and with it the suppression of artifacts. Thus the amount of artifact reduction is dosed according to the actual need.

Having explained the present invention mostly on the basis of the specific embodiment, it has to noted here that, generally, it is possible to reverse the role of the two sides, that is, the pixels in front of a boundary line are used as indicators to modify the histogram in question to make it more uniform or have it behave like a more uniform histogram and the pixels behind the boundary line are directly taken into account for building the histogram.

Figure 4:
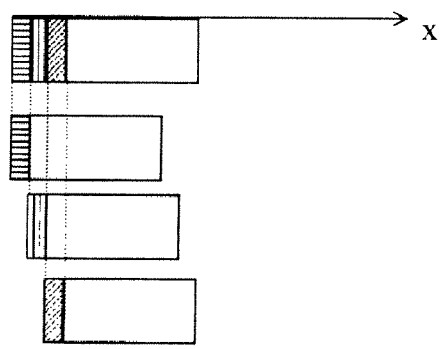
FIG. 4 shows the horizontal overlapping of the block structure used in the embodiment.
Figure 5:
FIG. 5 shows an original image.
Figure 6:
FIG. 6 shows the structures of local pixel value of the original image.

With reference to FIG. 4, the block structure used by the embodiment is now explained. The present invention can be combined with the state of the art technique of block overlapping. Block overlapping is known to reduce blocking artifacts. Block overlapping, however, may also aggravate fading and object extension artifacts. FIG. 4 shows three rectangular blocks overlapping densely in a horizontal x-direction. For better visualization, these three blocks are also shown separately (the three lower blocks). In order not to map twice, only the pixels in the area filled with a pattern should be mapped with the mapping function derived from the entire block. The block structure used by the embodiment overlaps also in vertical direction. For simplicity, the vertical overlapping of blocks is not shown in FIG. 4. Thus in order not to map twice, the area that is mapped with the mapping function must be further reduced. Only the non-overlapping area, in horizontal as in vertical direction, is mapped with the mapping function derived from the entire block. More specifically, in this embodiment only the upper left corner of each block is mapped. Thus only a very small part of the pixels of each block is mapped, although the histograms are built from the entire blocks. Since only the top left pixels are mapped, the histogram modification usually does not affect the pixels behind the detected boundary line.

Figure 7:
FIG. 7 shows two difference pictures between processed and original image.

In FIG. 7 two difference pictures between processed and original image are displayed (added by an offset and amplified by a factor for better visualization using printed pictures). In the right picture the original image was processed using the embodiment of the histogram equalization method according to the present invention. In the left picture the original image was processed using prior art histogram equalization. In the left (prior art) difference picture brightness variations corresponding to pronounced object extension artifacts are present at the boundary line discerning shoulders and arms from the background: In the boundary area the pullover got darker and the background got lighter by processing the image with the prior art technique. Also, brightness variations corresponding to fading artifacts are present at the boundary line between pullover and neck: The skin color got lighter close to the pullover. These artifacts are greatly reduced when processing is done with the embodiment of the histogram equalization method according to the present invention, as can be seen from the picture to the right.

While the preferred and alternative embodiments of the present invention have been disclosed and detailed herein, it will be apparent to those skilled in the art that various changes may be made to the configuration, operation and form of the invention without departing from the scope thereof. In particular, it is noted that the respective features of the invention, even those disclosed solely in combination with other features of the invention, may be combined in any combination excepting those readily apparent to the person skilled in the art as nonsensical.

The invention claimed is:

1. An adaptive histogram equalization method for enhancing contrast of digital images, comprising:
    dividing an image into regions of pixels,
    determining structures of relative local pixel value differences of at least a predefined difference value,
    building, for every region with a determined structure of relative local pixel value difference, a histogram of pixel values of pixels within the region, based on respective pixel values of pixels located on a first side of the determined structure and on maximum and minimum pixel values for pixels located on a second side of the determined structure, and
    mapping pixel values of each region based on the histogram corresponding to the region.

2. An adaptive histogram equalization method according to claim 1, wherein,
    for regions with a determined structure of relative local pixel value differences, a number of pixels located on said second side of the determined structure modifies the histogram such that a larger number of pixels on said second side provides a higher degree of balance or uniform distribution of the corresponding histogram obtained in said building.

3. An adaptive histogram equalization method according to claim 2, wherein
    the pixels on said second side are accounted for in the corresponding histogram as part pixels carrying a minimum value and part pixels carrying a maximum value.

4. An adaptive histogram equalization method according to claim 1, further comprising:
    smoothing the histograms or deriving smoothing functions from the histograms, wherein
    the smoothed histograms or the derived smoothing functions are used in said mapping pixel values.

5. An adaptive histogram equalization method according to claim 1, wherein,
    for regions with no determined structures of relative local pixel value differences, the corresponding histogram is built from the pixel values of all pixels of the region.

6. An adaptive histogram equalization method according to claim 1, wherein
    said determined structures of local pixel value differences of a predefined difference are determined by an edge detection method or a Sobel operator.

7. An adaptive histogram equalization method according to claim 6, wherein
    single and sparsely distributed edge points determined by the edge detection method are deleted and/or broken edges are connected by means of morphological filters.

8. An adaptive histogram equalization method according to claim 1, further comprising:
    determining skin colored pixels, wherein,
    for regions with skin colored pixels, a number of skin colored pixels modifies the corresponding histogram such that a larger number of skin colored pixels in the region provides a higher degree of balance or uniform distribution of the corresponding histogram obtained in said building.

9. An adaptive histogram equalization method according to claim 1, wherein
    the histograms are homogenized.

10. An adaptive histogram equalization method according to claim 1, wherein
    the regions are overlapping, and
    the values of pixels located in an overlapping part of a region and the values of pixels located in a non-overlapping part of a region are mapped only once.

11. An adaptive histogram equalization method according to claim 1, wherein
    the pixel values are values relating to brightness and/or color of the pixels, luminance values and/or chrominance or chrominance difference values of a YUV, YIQ, or YCbCr color model, or other color model based image formats.

12. An adaptive histogram equalization processor for enhancing contrast of digital images, comprising:

a region specifying device for dividing an image into regions of pixels, a structure determining device for determining structures of relative local pixel value differences of at least a predefined difference value, a histogram building device for building, for every region with a determined structure of relative local pixel value difference, a histogram of pixel values of pixels within the region, based on respective pixel values of pixels located on a first side of the determined structure and on maximum and minimum pixel values for pixels located on a second side of the determined structure, and a mapping device for mapping pixel values of each region based on the histogram corresponding to the region.

13. An adaptive histogram equalization processor according to claim 12, wherein, for regions with a determined structure of relative local pixel value differences, the histogram building device is adapted to modify the corresponding histogram based on a numbers of pixels located on said second side of the determined structure such that a larger number of pixels on said second side provides a higher degree of balance or uniform distribution of the corresponding histogram obtained by the histogram building device.

14. An adaptive histogram equalization processor according to claim 13, wherein the histogram building device is adapted to account for the pixels on said second side in the corresponding histogram as part pixels carrying a minimum value and part pixels carrying a maximum value.

15. An adaptive histogram equalization processor according to claim 12, further comprising:

a filtering device for smoothing the histograms or deriving smoothing functions, wherein the smoothed histograms of the derived smoothing functions are used by the mapping device for the mapping of the pixel values.

16. An adaptive histogram equalization processor according to claim 12, wherein, for regions with no determined structures of relative local pixel value differences, the histogram building device is adapted to build the corresponding histogram from the pixel values of all pixels of the region.

17. An adaptive histogram equalization processor according to claim 12, wherein the structure determining device is adapted to detect said determined structures of local pixel value differences of a predefined difference by an edge detection method or a Sobel operator.

18. An adaptive histogram equalization processor according to claim 17, wherein the structure determining device is adapted to delete single and sparsely distributed edge points determined by the edge detection method and/or is adapted to connect broken edges by means of morphological filters.

19. An adaptive histogram equalization processor according to claim 12, further comprising:

a skin color detection device for determining skin colored pixels, wherein, for regions with skin colored pixels, the histogram building device is adapted to modify the corresponding histogram based on a number of skin colored pixels such that a larger number of skin colored pixels in the region provides a higher degree of balance or uniform distribution of the corresponding histogram obtained by the histogram building device.

20. An adaptive histogram equalization processor according to claim 12, wherein the histograms are homogenized.

21. An adaptive histogram equalization processor according to claim 12, wherein the regions are overlapping, and the mapping device is adapted to map the values of pixels located in a non-overlapping part of a region and the values of pixels located in an overlapping part of a region only once.

22. An adaptive histogram equalization processor according to claim 12, wherein the pixel values are values relating to brightness and/or color of the pixels, luminance values and/or chrominance or chrominance difference signals of a YUV, YIQ, or YCbCr color model, or other color model based image formats.

23. A non-transitory computer readable storage medium storing program instructions thereon that, when executed by a processor, direct the processor to carry out the adaptive histogram equalization method according to any one of the claims 1 to 9.

* * * * *